(No Model.)
L. HERRIN.
COMBINED KNIFE AND SCALE.
No. 598,225.                                  Patented Feb. 1, 1898.
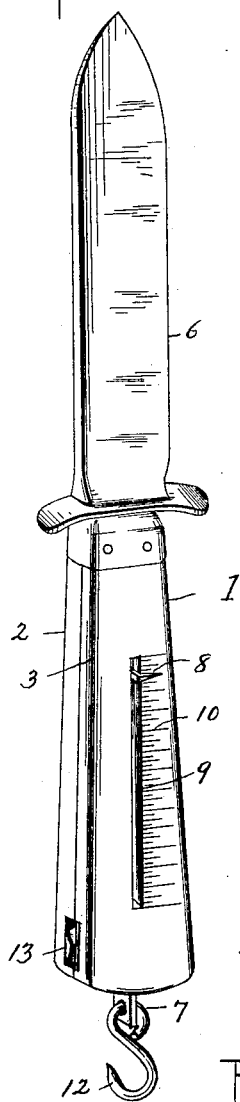
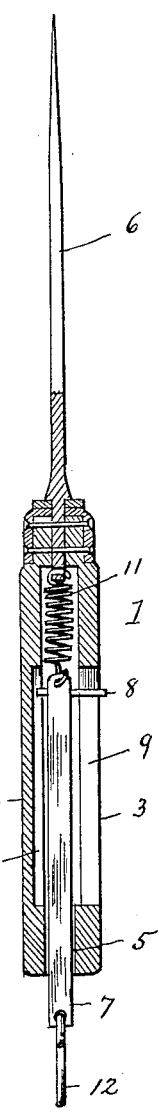
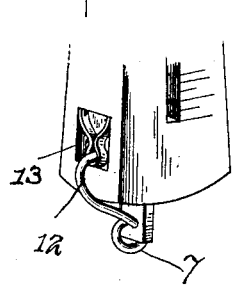
Witnesses
Inventor
Lemuel Herrin
Attorney

UNITED STATES PATENT OFFICE.

LEMUEL HERRIN, OF TIMPSON, TEXAS.

COMBINED KNIFE AND SCALE.

SPECIFICATION forming part of Letters Patent No. 598,225, dated February 1, 1898.

Application filed May 3, 1897. Serial No. 634,843. (No model.)

*To all whom it may concern:*

Be it known that I, LEMUEL HERRIN, a citizen of the United States, residing at Timpson, in the county of Shelby and State of Texas, have invented certain new and useful Improvements in a Combined Knife and Scale; and I do declare the following to be a full, clear, and exact description of the invention, such as will enable others skilled in the art to which it appertains to make and use the same.

My invention has relation to a combined knife and scale, and is particularly adapted for the use of butchers.

The object of the invention, which combines in one simple article a knife and scale, is that when the meat is cut its weight may be ascertained without the employment of a separate set of scales.

With this object in view the invention consists in the construction, combination, and arrangement of the same, as will be hereinafter more fully described, and particularly pointed out in the claims.

In the accompanying drawings, Figure 1 is a perspective view of my improved combined knife and scale; Fig. 2, a longitudinal sectional view of the same. Fig. 3 is an enlarged view of the lower end of the knife-handle, showing the point of the hook held in the recess by the spring-clasp; and Fig. 4 is a detail perspective view of the clasp.

In the drawings, 1 denotes the handle of the knife, which consists of two parts 2 and 3, formed with corresponding recesses 4 and 5. 6 denotes the blade of the knife, with the scale secured to the handle in any well-known manner, and 7 denotes a bar which is adapted to the recesses 4 and 5. This bar is provided with a pointer 8, which projects through a longitudinal slot 9 in the handle of the knife and is adapted to traverse a scale 10, marked upon the handle at one side of the slot 9. The upper end of the bar is connected to the shank of the blade by a coil-spring 11, and the lower end of the bar is provided with a hook 12, adapted to support the goods to be weighed.

13 denotes the spring-clasp, secured in the side of the handle. This clasp is adapted to receive and hold by friction the hook when the knife is used for cutting, so that the hook will not catch into things and otherwise be in the way.

From the foregoing description, taken in connection with the accompanying drawings, the operation and advantages of the invention will be readily understood without requiring further explanation.

The device is exceedingly simple, may be made at a small cost, and will be found very useful for the purpose for which it is designed.

Having thus fully described my invention, what I claim as new and useful, and desire to secure by Letters Patent of the United States, is—

1. A combined knife and scale, consisting of a blade, a handle secured to the shank thereof and provided with an elongated cavity extending from its lower end to the end of the blade-shank, and with a slot in one of its faces communicating with said cavity, and with a recess in its edge at its lower end, a spring-clasp in said recess, a scale arranged on said knife-handle in proximity to said slot, a rod arranged to reciprocate in said cavity and carrying a pointer for the scale projecting through said slot, a suspension-hook loosely hung upon the outer end of said rod, and when not in use having its point shielded and held within the recess by the spring-clasp, and a spring also arranged in said cavity and connecting the blade-shank and the inner end of the rod, said blade, the spring and rod being situated in the same plane, substantially as set forth.

2. A knife having in its handle a spring-actuated bar and a recess, a spring-catch in the recess, and a hook loosely hung to the lower end of the bar and when not in use adapted to have its point shielded and protected within the recess by the spring-catch, substantially as set forth.

In testimony whereof I hereunto affix my signature in presence of two witnesses.

LEMUEL HERRIN.

Witnesses:
W. P. WILLIAMS,
K. LASSETTER.